(12) United States Patent
Martisauskas (10) Patent No.: US 11,119,582 B2
(45) Date of Patent: Sep. 14, 2021

(54) ACTUATION LOCK FOR A TOUCH SENSITIVE INPUT DEVICE

(71) Applicant: Apple Inc., Cupertino, CA (US)

(72) Inventor: Steven J. Martisauskas, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/670,810

(22) Filed: Oct. 31, 2019

(65) Prior Publication Data

US 2020/0064927 A1   Feb. 27, 2020

Related U.S. Application Data

(63) Continuation of application No. 15/727,281, filed on Oct. 6, 2017, now Pat. No. 10,466,805, which is a continuation of application No. 13/232,968, filed on Sep. 14, 2011, now Pat. No. 9,785,251.

(51) Int. Cl.
| | |
|---|---|
| *G06F 3/02* | (2006.01) |
| *G06F 3/01* | (2006.01) |
| *G06F 3/044* | (2006.01) |
| *G06F 1/16* | (2006.01) |

(52) U.S. Cl.
CPC ........... *G06F 3/0202* (2013.01); *G06F 3/016* (2013.01); *G06F 3/0446* (2019.05); *G06F 1/1662* (2013.01); *G06F 2203/04809* (2013.01)

(58) Field of Classification Search
CPC ...... G06F 3/0202; G06F 3/0446; G06F 3/016; G06F 1/1662; G06F 2203/04809
See application file for complete search history.

(56) References Cited

U.S. PATENT DOCUMENTS

| | | | |
|---|---|---|---|
| 4,188,136 A | 2/1980 | Bedocs | |
| 4,387,367 A | 6/1983 | Fisher | |
| 4,417,294 A | 11/1983 | Herron, Jr. | |
| 5,189,403 A | 2/1993 | Franz et al. | |
| 5,269,004 A | 12/1993 | Comerford et al. | |

(Continued)

FOREIGN PATENT DOCUMENTS

| | | |
|---|---|---|
| CN | 1430235 A | 7/2003 |
| CN | 1882904 A | 12/2006 |

(Continued)

OTHER PUBLICATIONS

Non-Final Office Action received for U.S. Appl. No. 16/802,401, dated Apr. 1, 2020, 17 pages.

(Continued)

*Primary Examiner* — Premal R Patel
(74) *Attorney, Agent, or Firm* — Kubota & Basol LLP (57) ABSTRACT

Touch sensitive mechanical keyboards and methods of configuring the depressibility of one or more keys of a keyboard are provided. A touch sensitive mechanical keyboard can accept touch events performed on the surface of the keys. Additionally, the keyboard can accept key depressions as textual input. The keyboard can be placed in a gesture operation mode, which can lock the keys to prevent a user from inadvertently depressing a key while attempting to perform a touch event on the surface of the keys. The keyboard can also be placed in a key press mode, which can allow depression of the keys by a user.

20 Claims, 7 Drawing Sheets

(56) References Cited

U.S. PATENT DOCUMENTS

| | | | |
|---|---|---|---|
| 5,341,133 A | 8/1994 | Savoy et al. | |
| 5,483,261 A | 1/1996 | Yasutake | |
| 5,488,204 A | 1/1996 | Mead et al. | |
| 5,581,243 A | 12/1996 | Ouellette et al. | |
| 5,675,361 A | 10/1997 | Santilli | |
| 5,707,160 A | 1/1998 | Bowen | |
| 5,736,976 A | 4/1998 | Cheung | |
| 5,745,719 A | 4/1998 | Falcon | |
| 5,821,922 A | 10/1998 | Sellers | |
| 5,825,352 A | 10/1998 | Bisset et al. | |
| 5,835,079 A | 11/1998 | Shieh | |
| 5,880,411 A | 3/1999 | Gillespie et al. | |
| 5,982,302 A | 11/1999 | Ure | |
| 6,188,391 B1 | 2/2001 | Seely et al. | |
| 6,204,839 B1 | 3/2001 | Mato, Jr. | |
| 6,310,610 B1 | 10/2001 | Beaton et al. | |
| 6,323,846 B1 | 11/2001 | Westerman et al. | |
| 6,377,685 B1 | 4/2002 | Krishnan | |
| 6,504,530 B1 | 1/2003 | Wilson et al. | |
| 6,518,958 B1 | 2/2003 | Miyajima et al. | |
| 6,529,186 B1 | 3/2003 | Thayer | |
| 6,690,387 B2 | 2/2004 | Zimmerman et al. | |
| 7,015,894 B2 | 3/2006 | Morohoshi | |
| 7,091,954 B2 | 8/2006 | Iesaka | |
| 7,184,064 B2 | 2/2007 | Zimmerman et al. | |
| 7,383,457 B1 | 6/2008 | Knight | |
| 7,428,142 B1 | 9/2008 | Ligtenberg et al. | |
| 7,659,887 B2 | 2/2010 | Larsen et al. | |
| 7,663,607 B2 | 2/2010 | Hotelling et al. | |
| 7,952,038 B1 | 5/2011 | Ando et al. | |
| 7,952,566 B2 | 5/2011 | Poupyrev et al. | |
| 8,479,122 B2 | 7/2013 | Hotelling et al. | |
| 8,581,870 B2 | 11/2013 | Bokma et al. | |
| 8,860,693 B2 | 10/2014 | Elias | |
| 8,933,905 B2 | 1/2015 | Bokma et al. | |
| 9,041,652 B2 | 5/2015 | Elias et al. | |
| 9,400,581 B2 | 7/2016 | Bokma et al. | |
| 9,454,239 B2 | 9/2016 | Elias | |
| 9,785,251 B2 | 10/2017 | Martisauskas | |
| 9,851,800 B1 | 12/2017 | Kneisley et al. | |
| 9,904,410 B2 | 2/2018 | Bokma et al. | |
| 2002/0171633 A1 | 11/2002 | Brinjes | |
| 2002/0175901 A1 | 11/2002 | Gettemy | |
| 2003/0025679 A1 | 2/2003 | Taylor et al. | |
| 2003/0116419 A1 | 6/2003 | Anzai | |
| 2003/0201982 A1* | 10/2003 | Iesaka | G06F 1/1662 345/168 |
| 2003/0205450 A1 | 11/2003 | Divigalpitiya et al. | |
| 2004/0183786 A1 | 9/2004 | Jam | |
| 2005/0174260 A1 | 8/2005 | Arneson et al. | |
| 2005/0262882 A1 | 12/2005 | Moon | |
| 2006/0026521 A1 | 2/2006 | Hotelling et al. | |
| 2006/0097991 A1 | 5/2006 | Hotelling et al. | |
| 2006/0187212 A1 | 8/2006 | Park et al. | |
| 2006/0197753 A1 | 9/2006 | Hotelling | |
| 2006/0232557 A1 | 10/2006 | Fallot-Burghardt | |
| 2006/0238510 A1 | 10/2006 | Panotopoulos et al. | |
| 2006/0255971 A1 | 11/2006 | Kim | |
| 2007/0063976 A1 | 3/2007 | Oga | |
| 2007/0120828 A1 | 5/2007 | Fyke | |
| 2007/0146334 A1 | 6/2007 | Inokawa | |
| 2007/0152975 A1 | 7/2007 | Ogihara et al. | |
| 2008/0001787 A1 | 1/2008 | Smith et al. | |
| 2008/0006453 A1 | 1/2008 | Hotelling | |
| 2008/0024459 A1 | 1/2008 | Poupyrev et al. | |
| 2008/0106519 A1* | 5/2008 | Murray | G06F 1/1626 345/169 |
| 2008/0158172 A1 | 7/2008 | Hotelling et al. | |
| 2008/0158181 A1 | 7/2008 | Hamblin et al. | |
| 2008/0162996 A1 | 7/2008 | Krah et al. | |
| 2008/0202824 A1 | 8/2008 | Philipp et al. | |
| 2008/0225006 A1 | 9/2008 | Ennadi | |
| 2008/0284736 A1 | 11/2008 | Trent, Jr. | |
| 2008/0297475 A1 | 12/2008 | Woolf et al. | |
| 2008/0309522 A1* | 12/2008 | Larsen | G06F 3/021 341/34 |
| 2009/0000936 A1 | 1/2009 | Steijner | |
| 2009/0002199 A1 | 1/2009 | Lainonen et al. | |
| 2009/0027347 A1 | 1/2009 | Wakefield et al. | |
| 2009/0091536 A1 | 4/2009 | Callaghan | |
| 2009/0128503 A1 | 5/2009 | Grant et al. | |
| 2009/0160785 A1 | 6/2009 | Chen et al. | |
| 2009/0167693 A1* | 7/2009 | Kuo | G06F 3/04886 345/168 |
| 2009/0210568 A1 | 8/2009 | Peterson et al. | |
| 2009/0314621 A1 | 12/2009 | Hotelling | |
| 2009/0322725 A1 | 12/2009 | David et al. | |
| 2010/0053087 A1 | 3/2010 | Dai et al. | |
| 2010/0059294 A1 | 3/2010 | Elias et al. | |
| 2010/0079309 A1 | 4/2010 | Filson et al. | |
| 2010/0123676 A1 | 5/2010 | Kirkup | |
| 2010/0134329 A1 | 6/2010 | Wang et al. | |
| 2010/0141574 A1 | 6/2010 | Jung et al. | |
| 2010/0148995 A1* | 6/2010 | Elias | G06F 3/0202 341/22 |
| 2010/0149099 A1 | 6/2010 | Elias | |
| 2010/0149108 A1 | 6/2010 | Hotelling et al. | |
| 2010/0164880 A1* | 7/2010 | Huang | G06F 3/04886 345/173 |
| 2010/0177057 A1 | 7/2010 | Flint et al. | |
| 2010/0259482 A1 | 10/2010 | Ball | |
| 2010/0271315 A1* | 10/2010 | Bathiche | G06F 3/0202 345/173 |
| 2010/0273534 A1 | 10/2010 | Strom | |
| 2011/0001706 A1 | 1/2011 | Sanford et al. | |
| 2011/0006991 A1 | 1/2011 | Elias | |
| 2011/0050638 A1 | 3/2011 | Lee | |
| 2011/0057899 A1 | 3/2011 | Sleeman et al. | |
| 2011/0102345 A1 | 5/2011 | Kim et al. | |
| 2011/0141052 A1 | 6/2011 | Bernstein et al. | |
| 2011/0163971 A1 | 7/2011 | Wagner et al. | |
| 2011/0167375 A1 | 7/2011 | Kocienda | |
| 2011/0169765 A1 | 7/2011 | Aono | |
| 2011/0193817 A1 | 8/2011 | Byun et al. | |
| 2011/0210917 A1* | 9/2011 | LaFave | G06F 3/0489 345/160 |
| 2011/0227834 A1* | 9/2011 | Yang | G06F 1/1662 345/169 |
| 2011/0227854 A1 | 9/2011 | Koya | |
| 2011/0233041 A1 | 9/2011 | Rajagopal et al. | |
| 2011/0241997 A1 | 10/2011 | Yang | |
| 2011/0267287 A1 | 11/2011 | Bartling et al. | |
| 2012/0032979 A1 | 2/2012 | Blow et al. | |
| 2012/0127078 A1* | 5/2012 | Vecera | G06F 3/0233 345/168 |
| 2012/0256839 A1* | 10/2012 | Suggs | G06F 3/0202 345/168 |
| 2012/0299866 A1 | 11/2012 | Pao et al. | |
| 2013/0063285 A1 | 3/2013 | Elias | |
| 2013/0063286 A1 | 3/2013 | Elias | |
| 2013/0063356 A1 | 3/2013 | Martisauskas | |
| 2013/0069883 A1 | 3/2013 | Oga | |
| 2013/0141342 A1 | 6/2013 | Bokma et al. | |
| 2014/0035856 A1 | 2/2014 | Bokma et al. | |
| 2015/0091867 A1 | 4/2015 | Bokma et al. | |
| 2016/0320906 A1 | 11/2016 | Bokma et al. | |
| 2018/0095545 A1 | 4/2018 | Martisauskas | |
| 2018/0162996 A1 | 6/2018 | Choi et al. | |
| 2018/0173364 A1 | 6/2018 | Bokma et al. | |
| 2019/0272060 A1 | 9/2019 | Bokma et al. | |
| 2020/0192490 A1 | 6/2020 | Elias | |

FOREIGN PATENT DOCUMENTS

| | | |
|---|---|---|
| CN | 101324822 A | 12/2008 |
| CN | 201285539 Y | 8/2009 |
| CN | 101583923 A | 11/2009 |
| CN | 101673164 A | 3/2010 |
| CN | 101689853 A | 3/2010 |
| CN | 101825966 A | 9/2010 |
| EP | 1653338 A1 | 5/2006 |
| GB | 2383194 A | 6/2003 |

(56) References Cited

FOREIGN PATENT DOCUMENTS

| | | |
|---|---|---|
| JP | 2000-163031 A | 6/2000 |
| JP | 2002-342033 A | 11/2002 |
| JP | 2010-152671 A | 7/2010 |
| JP | 2011-521374 A | 7/2011 |
| KR | 10-0617821 B1 | 8/2006 |
| KR | 10-2008-0023871 A | 3/2008 |
| KR | 10-2009-0002648 A | 1/2009 |
| TW | 201135568 A | 10/2011 |
| TW | 201142685 A | 12/2011 |
| WO | 2011/008861 A2 | 1/2011 |
| WO | 2011/018439 A1 | 2/2011 |
| WO | 2013/039698 A1 | 3/2013 |
| WO | 2013/085580 A1 | 6/2013 |

OTHER PUBLICATIONS

Examiner's Answer to Appeal Brief received for U.S. Appl. No. 12/333,793, dated Feb. 24, 2016, 3 pages.
Examiner's Answer to Appeal Brief received for U.S. Appl. No. 12/334,320, dated Mar. 13, 2014, 40 pages.
Final Office Action received for U.S. Appl. No. 12/333,793, dated May 30, 2019, 21 pages.
Notice of Allowance received for U.S. Appl. No. 12/333,793, dated Oct. 31, 2019, 12 pages.
Notice of Allowance received for U.S. Appl. No. 14/564,735, dated May 16, 2016, 2 pages.
Notice of Allowance received for U.S. Appl. No. 15/207,234, dated Jan. 23, 2018, 2 pages.
Office Action received for Australian Patent Application No. 2018282404, dated Nov. 25, 2019, 3 pages.
Office Action received for Chinese Patent Application No. 201710145990.1, dated Jun. 19, 2019, 26 pages (16 pages of English Translation and 10 pages of Official Copy).
Examiner's Answer to Appeal Brief received for U.S. Appl. No. 13/232,968, dated Sep. 10, 2015, 6 pages.
Final Office Action received for U.S. Appl. No. 12/333,793, dated Apr. 24, 2018, 22 pages.
Final Office Action received for U.S. Appl. No. 12/333,793, dated Mar. 9, 2012, 21 pages.
Final Office Action received for U.S. Appl. No. 12/333,793, dated Nov. 3, 2014, 24 pages.
Final Office Action received for U.S. Appl. No. 12/333,793, dated Sep. 17, 2013, 20 pages.
Final Office Action received for U.S. Appl. No. 12/334,320, dated Apr. 13, 2017, 41 pages.
Final Office Action received for U.S. Appl. No. 12/334,320, dated Oct. 16, 2012, 32 pages.
Final Office Action received for U.S. Appl. No. 13/232,941, dated Feb. 12, 2015, 23 pages.
Final Office Action received for U.S. Appl. No. 13/232,968, dated Oct. 2, 2014, 26 pages.
Final Office Action received for U.S. Appl. No. 13/232,968, dateed Sep. 26, 2013, 21 pages.
Final Office Action received for U.S. Appl. No. 14/050,103, dated Jun. 4, 2014, 11 pages.
Fingerworks, "TouchStream LP", User Interface Descriptions, Available online at: <http://fingerworks.com/ST_product.html>, Accessed on Nov. 13, 2008, 14 pages.
International Search Report received for PCT Patent Application No. PCT/US2012/052929, dated Dec. 5, 2012, 4 pages.
International Search Report received for PCT Patent Application No. PCT/US2012/052931, dated Feb. 5, 2013, 6 pages.
International Search Report received for PCT Patent Application No. PCT/US2012/053109, dated Dec. 19, 2012, 3 pages.
Lee et al., "A Multi-Touch Three Dimensional Touch-Sensitive Tablet", CHI'85 Proceedings, Apr. 1985, pp. 21-25.
Non-Final Office Action received for U.S. Appl. No. 12/333,793, dated Apr. 15, 2013, 20 pages.
Non-Final Office Action received for U.S. Appl. No. 12/333,793, dateed Aug. 10, 2017, 23 pages.
Non-Final Office Action received for U.S. Appl. No. 12/333,793, dated May 22, 2014, 24 pages.
Non-Final Office Action received for U.S. Appl. No. 12/333,793, dateed Oct. 6, 2011, 17 pages.
Non-Final Office Action received for U.S. Appl. No. 12/333,793, dated Sep. 7, 2018, 22 pages.
Non-Final Office Action received for U.S. Appl. No. 12/334,320, dated Apr. 27, 2012, 26 pages.
Non-Final Office Action received for U.S. Appl. No. 12/334,320, dateed Aug. 14, 2013, 38 pages.
Non-Final Office Action received for U.S. Appl. No. 12/334,320, dated Sep. 2, 2016, 39 pages.
Non-Final Office Action received for U.S. Appl. No. 13/232,941, dated Feb. 25, 2016, 17 pages.
Non-Final Office Action received for U.S. Appl. No. 13/232,941, dated Sep. 5, 2014, 14 pages.
Non-Final Office Action received for U.S. Appl. No. 13/232,941, dated Sep. 25, 2015, 14 pages.
Non-Final Office Action received for U.S. Appl. No. 13/232,955, dated Aug. 12, 2014, 8 pages.
Non-Final Office Action received for U.S. Appl. No. 13/232,968, dated Mar. 10, 2014, 25 pages.
Non-Final Office Action received for U.S. Appl. No. 13/232,968, dated May 9, 2013, 22 pages.
Non-Final Office Action received for U.S. Appl. No. 14/050,103, dated Dec. 13, 2013, 8 pages.
Non-Final Office Action received for U.S. Appl. No. 14/564,735, dated Sep. 25, 2015, 16 pages.
Non-Final Office Action received for U.S. Appl. No. 15/207,234, dated Apr. 24, 2017, 10 pages.
Non-Final Office Action received for U.S. Appl. No. 15/207,234, dated Aug. 25, 2016, 22 pages.
Non-Final Office Action received for U.S. Appl. No. 15/727,281, dated Oct. 16, 2018, 14 pages.
Non-Final Office Action received for U.S. Appl. No. 15/898,093, dated Jun. 14, 2018, 17 pages.
Notice of Allowance received for U.S. Appl. No. 13/232,941, dateed May 20, 2016, 7 pages.
Notice of Allowance received for U.S. Appl. No. 13/232,955, dated Jan. 23, 2015, 6 pages.
Notice of Allowance received for U.S. Appl. No. 13/232,968, dated Jun. 7, 2017, 8 pages.
Notice of Allowance received for U.S. Appl. No. 13/312,803, dated Jul. 18, 2013, 9 pages.
Notice of Allowance received for U.S. Appl. No. 14/050,103, dated Sep. 10, 2014, 7 pages.
Notice of Allowance received for U.S. Appl. No. 14/564,735, dated Mar. 28, 2016, 5 pages.
Notice of Allowance received for U.S. Appl. No. 15/207,234, dated Oct. 25, 2017, 7 pages.
Notice of Allowance received for U.S. Appl. No. 15/727,281, dated Jun. 19, 2019, 8 pages.
Notice of Allowance received for U.S. Appl. No. 15/898,093, dated Jan. 17, 2019, 5 pages.
Pash, A., "Hack Attack: Operate Your Mouse with Your Keyboard", Lifehacker, Available online at: <http://lifehacker.com/software/mouser/hack-attack-operate-your-own-mouse-with-your-keyboard-212816.php>, Accessed on Nov. 7, 2006, 4 pages.
Rubine, Dean H., "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Search Report received for Chinese Patent Application No. 201280057957.9, dated Mar. 8, 2016, 4 pages.
Search Report received for European Patent Application No. 17201576.0, dated Dec. 8, 2017, 4 pages.
Non-Final Office Action received for U.S. Appl. No. 16/415,657, dated Oct. 6, 2020, 21 pages.

(56) References Cited

OTHER PUBLICATIONS

Final Office Action received for U.S. Appl. No. 16/802,401, dated Oct. 26, 2020, 19 pages.
Search Report received for Taiwanese Patent Application No. 101134042, dated Oct. 29, 2013, 1 page.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Corrected Notice of Allowability received for U.S. Appl. No. 16/802,401, dated Mar. 18, 2021, 9 pages.
Final Office Action received for U.S. Appl. No. 16/415,657, dated Apr. 14, 2021, 14 pages.
Notice of Allowance received for U.S. Appl. No. 16/802,401, dated Feb. 18, 2021, 13 pages.

* cited by examiner

ACTUATION LOCK FOR A TOUCH SENSITIVE INPUT DEVICE

CROSS-REFERENCE TO RELATED APPLICATIONS

This application is a continuation of U.S. patent application Ser. No. 15/727,281, filed on Oct. 6, 2017 and published on Apr. 5, 2018 as U.S. Patent Publication No. 2018/0095545, which is a continuation of U.S. patent application Ser. No 13/232,968, filed on Sep. 14, 2011 and issued on Oct. 10, 2017 as U.S. Pat. No. 9,785,251, the entire disclosures of which are incorporated herein by reference in their entirety for all purposes.

FIELD OF THE DISCLOSURE

This relates generally to input devices and, more specifically, to keyboard input devices.

BACKGROUND OF THE DISCLOSURE

Keyboards are widely used and are generally accepted as the preferred way to provide textual input to a computing system. These keyboards have mechanical keys that are arranged in the so-called QWERTY layout and are configured to move independently of one another and to comply with standards for key spacing and actuation force. Textual input is received when the keys are depressed. Keyboard layout specifications have been provided in both extended and compact forms by the International Organization for Standardization (ISO), the American National Standards Institute (ANSI), and Japanese Industrial Standards (JIS).

There have been numerous attempts made to introduce an alternative to the standard keyboard. The changes include, but are not limited to, non-QWERTY layouts, concave and convex surfaces, capacitive keys, split designs, membrane keys, etc. However, while such alternative keyboards may provide improved usability or ergonomics, they have failed to replace or duplicate the commercial success of the conventional mechanical keyboard.

SUMMARY OF THE DISCLOSURE

This relates to touch sensitive mechanical keyboards and methods of configuring the depressibility of one or more keys of a keyboard. A touch sensitive mechanical keyboard can accept touch events performed on the surface of the keys. Additionally, the keyboard can accept key depressions as textual input. The keyboard can be placed in a gesture operation mode, which can lock the keys to prevent a user from inadvertently depressing a key while attempting to perform a touch event on the surface of the keys. The keyboard can also be placed in a key press mode, which can allow depression of the keys by a user.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

Various embodiments relate to touch sensitive mechanical keyboards and methods of configuring the depressibility of one or more keys of a keyboard. A touch sensitive mechanical keyboard can accept touch events performed on the surface of the keys. Additionally, the keyboard can accept key depressions as textual input. The keyboard can be placed in a gesture operation mode, which can lock the keys to prevent a user from inadvertently depressing a key while attempting to perform a touch event on the surface of the keys. The keyboard can also be placed in a key press mode, which can allow depression of the keys by a user.

Although embodiments disclosed herein may be described and illustrated in terms of touch sensitive mechanical keyboards, it should be understood that the embodiments are not so limited, but are additionally applicable to mechanical keyboards without a touch sensitive element.

Figure 1:
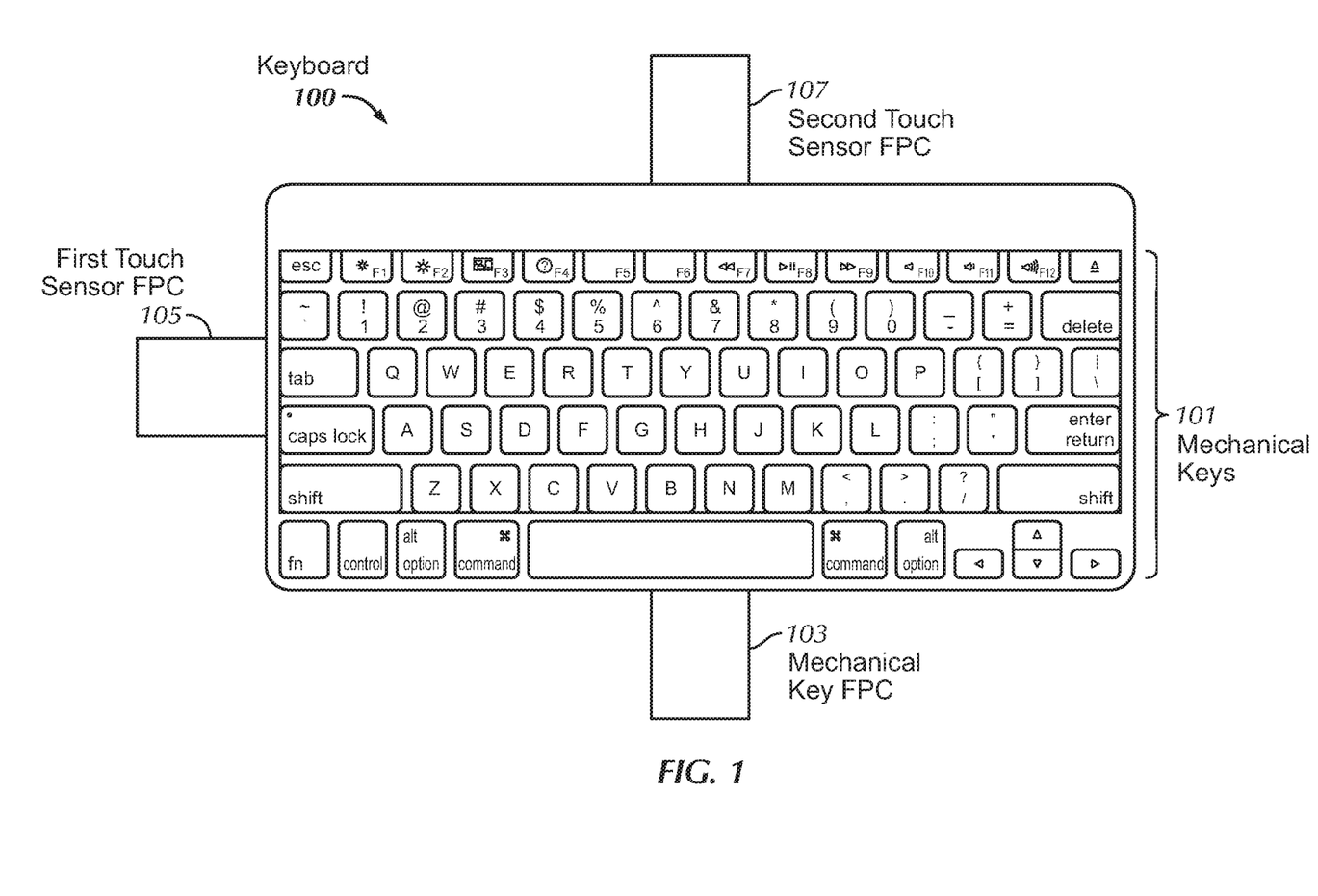
FIG. 1 illustrates an exemplary touch sensitive mechanical keyboard having mechanical keys and a touch sensitive area located on the surfaces of mechanical keys according to embodiments of the disclosure.

FIG. 1 illustrates an exemplary touch sensitive mechanical keyboard 100 having mechanical keys 101 and a touch sensitive area located on the surfaces of mechanical keys 101. In some embodiments, keyboard 100 can be configured to have the look and feel of a conventional keyboard. For instance, each mechanical key 101 can be individually depressible, giving the user of keyboard 100 tactile feedback associated with each depression of a key. Mechanical keys 101 can be used for text entry in a manner similar to a conventional keyboard. Additionally, the touch sensitive area of keyboard 100 can be used to detect touch events, such as taps or swipes, on the surface of mechanical keys 101. In this way, keyboard 100 can also be used for cursor input functions, such as point, click, scroll, drag, select, zoom, and the like, without requiring the user to remove their hands from keyboard 100. These functions, and more, can be driven by hand/finger motion while the fingers are sliding over and touching mechanical keys 101.

In some embodiments, the touch sensitive area of keyboard 100 can include the surfaces of all mechanical keys 101. In other embodiments, the touch sensitive area can include the surfaces of only a portion of mechanical keys 101. By integrating multi-touch input capability into keyboard 100 without altering its overall appearance or, more importantly, the familiar way in which it is used for typing, many of the benefits of multi-touch gesture-based input capability can be realized without having any negative impact on the user's text entry experience.

In some embodiments, keyboard 100 can further include mechanical key flexible printed circuit (FPC) 103, first touch sensor FPC 105, and second touch sensor FPC 107 for coupling keyboard 100 to a processor or host computer system. For example, mechanical key FPC 103 can be used by keyboard 100 to output information relating to the depression of one or more of mechanical keys 101. Specifically, a signal indicating that one or more mechanical keys 101 have been depressed can be transmitted through mechanical key FPC 103 to a processor. Similarly, first and second touch sensor FPCs 105 and 107 can be used to output or receive information relating to a touch sensor included within keyboard 100. For example, in some embodiments, keyboard 100 can include a capacitive touch sensor having multiple drive lines and multiple sense lines. In these embodiments, one of first touch sensor FPC 105 and second touch sensor FPC 107 can be used to receive stimulation signals for driving the drive lines while the other touch sensor FPC can be used to transmit touch signals received on the sense lines. In other embodiments, two or more of mechanical key FPC 103, first touch sensor FPC 105, and second touch sensor FPC 107 can be combined into a single FPC.

While specific examples of touch sensitive mechanical keyboard 100 are provided above, it should be appreciated that the principals described in the present disclosure can similarly be applied to touch sensitive mechanical keyboards having other features and configurations.

Figure 2:
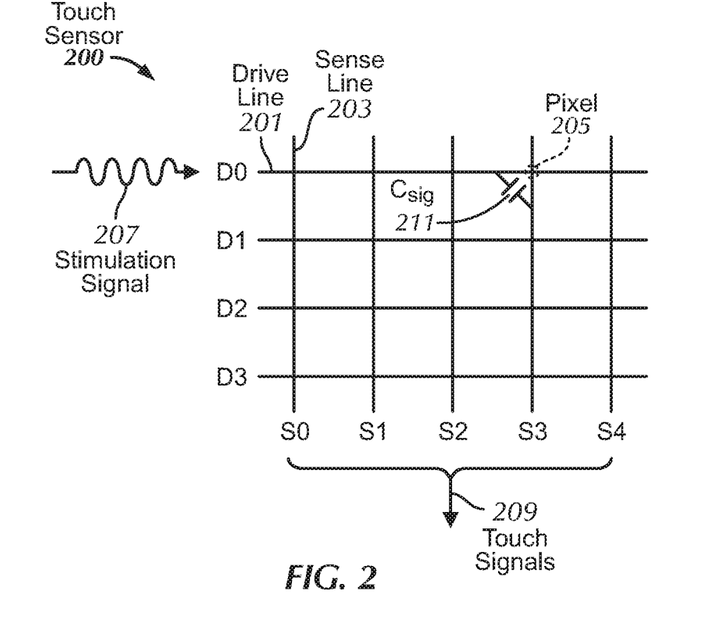
FIG. 2 illustrates a portion of an exemplary touch sensor that can be used to detect touch events on touch sensitive mechanical keyboard according to embodiments of the disclosure.

FIG. 2 illustrates a portion of an exemplary touch sensor 200 that can be used to detect touch events on touch sensitive mechanical keyboard 100. Touch sensor 200 can include an array of pixels 205 that can be formed at the crossing points between rows of drive lines 201 (D0-D3) and columns of sense lines 203 (S0-S4). Each pixel 205 can have an associated mutual capacitance Csig 211 formed between the crossing drive lines 201 and sense lines 203 when the drive lines are stimulated. The drive lines 201 can be stimulated by stimulation signals 207 provided by drive circuitry (not shown) and can include an alternating current (AC) waveform. The sense lines 203 can transmit touch or sense signals 209 indicative of a touch at the panel 200 to sense circuitry (not shown), which can include a sense amplifier for each sense line.

To sense a touch at the touch sensor 200, drive lines 201 can be stimulated by the stimulation signals 207 to capacitively couple with the crossing sense lines 203, thereby forming a capacitive path for coupling charge from the drive lines 201 to the sense lines 203. The crossing sense lines 203 can output touch signals 209, representing the coupled charge or current. When a user's finger (or other object) touches the panel 200, the finger can cause the capacitance Csig 211 to reduce by an amount ΔCsig at the touch location. This capacitance change ΔCsig can be caused by charge or current from the stimulated drive line 201 being shunted through the touching finger to ground rather than being coupled to the crossing sense line 203 at the touch location. The touch signals 209 representative of the capacitance change ΔCsig can be transmitted by the sense lines 203 to the sense circuitry for processing. The touch signals 209 can indicate the pixel where the touch occurred and the amount of touch that occurred at that pixel location. As discussed above, in some embodiments, stimulation signals 207 and touch signals 209 can be received and transmitted via first and second touch sensor FPCs 105 and 107.

While the embodiment shown in FIG. 2 includes four drive lines 201 and five sense lines 203, it should be appreciated that touch sensor 200 can include any number of drive lines 201 and any number of sense lines 203 to form the desired number and pattern of pixels 205. Additionally, while the drive lines 201 and sense lines 203 are shown in FIG. 2 in a crossing configuration, it should be appreciated that other configurations are also possible to form the desired pixel pattern. While FIG. 2 illustrates mutual capacitance touch sensing, other touch sensing technologies may also be used in conjunction with embodiments of the disclosure, such as self-capacitance touch sensing, resistive touch sensing, projection scan touch sensing, and the like. Furthermore, while various embodiments describe a sensed touch, it should be appreciated that the touch sensor 200 can also sense a hovering object and generate hover signals therefrom.

Figure 3:
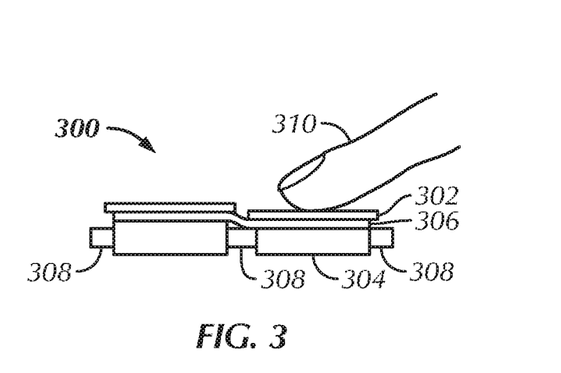
FIG. 3 illustrates an exemplary keyboard in a key press mode according to embodiments of the disclosure.

FIG. 3 illustrates an exemplary keyboard 300 in a key press mode. A key 302 can be situated on an actuator 304. In some embodiments, a touch sensor 306 can be situated between the key 302 and the collapsible actuator 304. One or more keys and actuators can be held in place by a housing 308. Each key can be configured to be depressed, for example, by a finger 310. When the key 302 is depressed, it can cause the actuator 304 to collapse, which can then cause a control signal to be sent to a device indicating that the key 302 has been depressed. When the key 302 is released, the actuator 304 can return to its initial shape, pushing the key back into its initial position.

Figure 4:
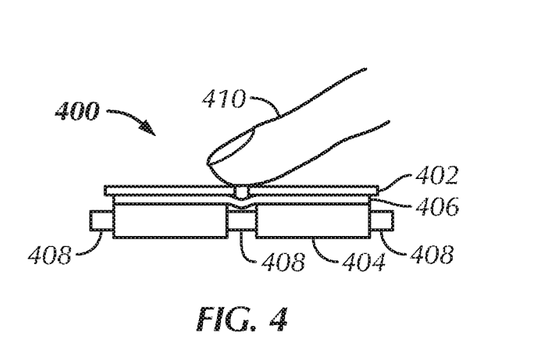
FIG. 4 illustrates an exemplary keyboard in a gesture mode according to embodiments of the disclosure.

FIG. 4 illustrates an exemplary keyboard 400 in a gesture mode. In this mode, an actuator 404 can be rigid and non-collapsible. The rigidity of the actuator 404 can prevent a key 402 from being depressed. Additionally, the rigidity of the actuator 404 can prevent the key 402 from cambering, sliding, or rotating, as illustrated in FIGS. 9A-9C and 10A-10C. Accordingly, the rigidity of the actuator 404 can provide a stable surface for touch events.

Figure 5A:
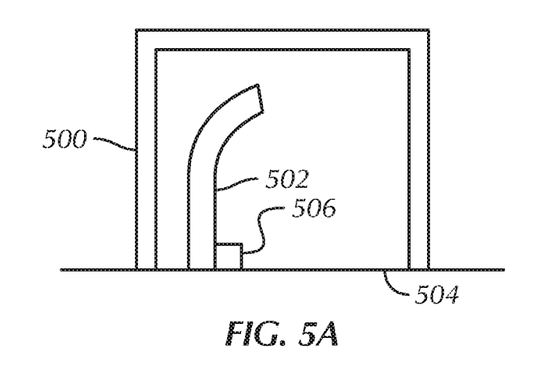
FIG. 5A illustrates an exemplary actuator in a key press mode according to embodiments of the disclosure.

According to various embodiments, a single actuator can be collapsible in a key press mode and rigid in a gesture mode. FIG. 5A illustrates an exemplary actuator in a key press mode. In some embodiments, the housing 504 can be in contact with both a shell 500 and an arm 502. Additionally, the arm 502 can be connected to a stimulator 506. The shell 500 can be formed of a collapsible material, such as rubber. Accordingly, the actuator can be collapsible in a key press mode.

In some embodiments, the arm 502 can be formed of a dynamic shape-memory material having several states. The material may change its state when a stimulus is applied and return to its original state when the stimulus is reduced or terminated. The material may have two states—a bent state and an upright state. An example material may include nitinol. For example, in FIG. 5A, the arm 502 may naturally flex or bend until a stimulus is applied to make the material rigid and straight in an upright position.

Figure 5B:
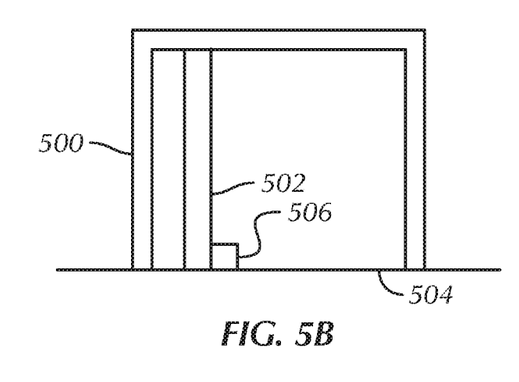
FIG. 5B illustrates an exemplary actuator in a gesture mode according to embodiments of the disclosure.

FIG. 5B illustrates an exemplary actuator in a gesture mode. The stimulator 506 can apply a stimulus to arm 502, causing the arm to become rigid and straight in an upright position in direct contact with the shell 500. Example stimuli may include electrical current, heat, or any suitable stimulus capable of changing such a material. The contact between the shell 500 and the arm 502 can prevent the shell from collapsing. Accordingly, the actuator can be rigid in a gesture mode.

Figure 6A:
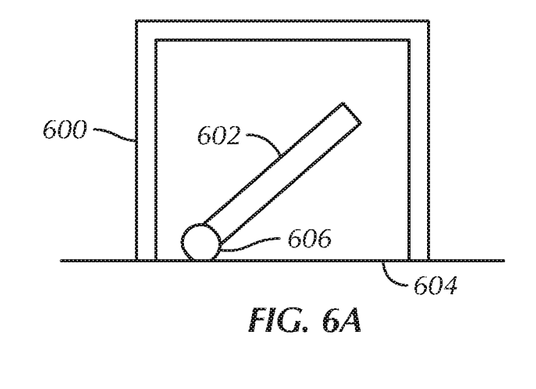
FIG. 6A illustrates an exemplary actuator with a driver in a key press mode according to embodiments of the disclosure.

FIG. 6A illustrates an exemplary actuator with a driver in a key press mode. According to some embodiments, the arm 602 can be connected to a driver 606 that can rotate the arm. The driver 606 can be an electromechanical device such as a microelectromechanical device or a piezoelectronic device, and the arm 602 can be a rigid material. The arm 602 can be rotated by the driver 606 such that it is not in direct contact with the shell 600, which can allow the shell to be collapsible, as shown in FIG. 6A.

Figure 6B:
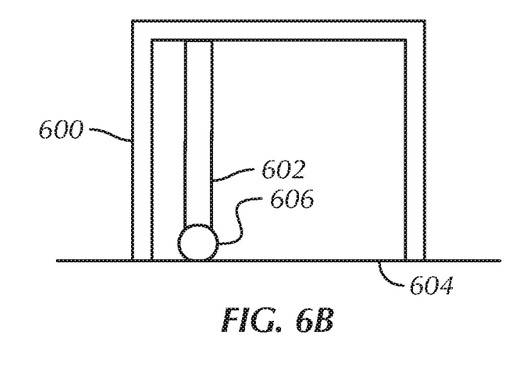
FIG. 6B illustrates an exemplary actuator with a driver in a gesture mode according to embodiments of the disclosure.

FIG. 6B illustrates an exemplary actuator with a driver in a gesture mode. In a gesture mode, the driver 606 can rotate the arm 602 so that the arm is in direct contact with the shell 600, which can prevent the shell from collapsing.

Figure 7:
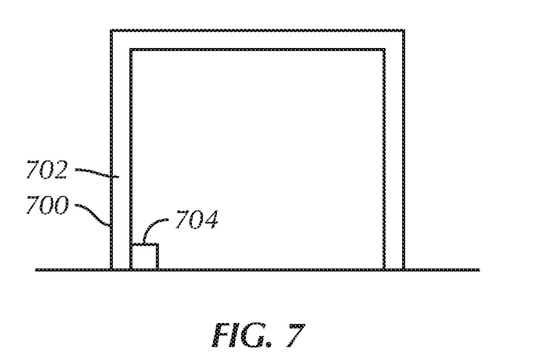
FIG. 7 illustrates an exemplary actuator containing magnetorheological fluid according to embodiments of the disclosure.

FIG. 7 illustrates an exemplary actuator containing magnetorheological fluid. According to some embodiments, a shell 700 can be formed of a collapsible material, such as rubber, and further contain a magnetorheological fluid 702 having several states. The fluid 702 may change its state when a stimulus is applied by stimulator 704 and return to its original state when the stimulus is reduced or terminated. For example, the fluid 702 can have increased viscosity when stimulated by the stimulator 704 with an electric charge or other suitable stimulus capable of changing such a fluid. In such a state, the fluid 702 can be so viscous as to prevent the shell 700 from collapsing. Accordingly, the actuator can be rigid in a gesture mode.

Additionally, the stimulator 704 can reduce or terminate the electric charge applied to the fluid 702, causing the fluid to have reduced viscosity. In such a state, the fluid 702 can have such a reduced viscosity that the shell 700 is collapsible. Accordingly, the actuator can be collapsible in a key press mode.

The actuator itself can be thin to fit in a keyboard housing. Additionally, the driver or stimulator of the actuator can consume a low amount of power to facilitate inclusion in a battery-powered device, such as a laptop. The actuator material can be chosen to be thin and to require only a low amount of power. The actuators can be controlled by a processor or state machine located within the keyboard housing or in a separate unit.

Figure 8:
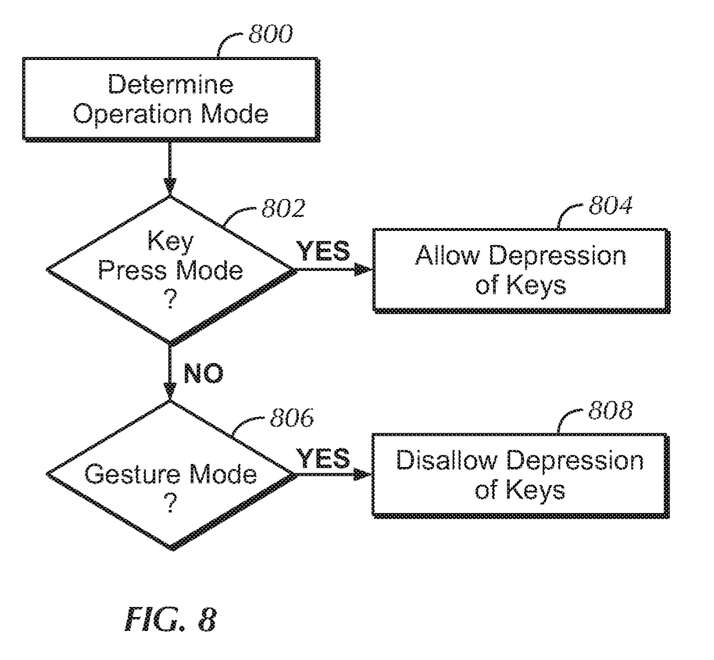
FIG. 8 is a high-level flow diagram illustrating an exemplary method of configuring the depressibility of keys on a keyboard according to embodiments of the disclosure.

FIG. 8 is a high-level flow diagram illustrating an exemplary method of configuring the depressibility of keys on a keyboard. At block 800, an operation mode of a keyboard can be determined. An operation mode can determine whether one or more keys should allow depression. For example, in a key press mode, one or more keys can be configured to allow depression. Alternatively, in a gesture mode, one or more keys can be configured to disallow depression. Additionally, an operation mode might apply differently to a subset of keys. For example, in a gesture mode, text input keys can be configured to disallow depression, whereas other keys can be configured to allow depression.

The operation mode can be determined by any number of methods, according to various embodiments. In some embodiments, the default operation mode can be a key press mode. Based on the default operation mode, the operation mode can be determined to be a key press mode unless a gesture or other touch event is detected. In other embodiments, the default operation mode can be a gesture mode. Based on the default operation mode, the operation mode can be determined to be a gesture mode unless a key press is expected. For example, a key press may be expected only if there is an active text input field on a connected device. If the text input field has an inactive status, then a key press may not be expected.

In other embodiments, the mode can be determined by virtual or mechanical switches or buttons, detected touch gestures, and the like. For example, the detection of objects (e.g., fingers) resting on the keys in a "home row" configuration, whether or not the fingers are actually over the home row, can be used to switch to the key press mode. In another example, the detection of only two fingers resting on nearby keys may be an indication that a two-fingered gesture is forthcoming, and therefore can be used to switch to a gesture mode. Touch data from the touch sensors can be sent to a processor or state machine located within the keyboard housing or in a separate unit, which can process the touch data to determine the position of the touching objects and control the actuators and modes accordingly.

Additionally, the operation mode may be determined only for certain keys. For example, the default mode for text input keys may be a gesture mode because a key press might only be expected if there is a text input field on a connected device. However, the default mode for function keys may be a key press mode because a function key press may be expected at any time and also a gesture may not be expected on a function key.

At decision diamond 802, if the operation mode is a key press mode, then depression of keys can be allowed at block 804. The depression of a key can be allowed either by maintaining an actuator's collapsibility or by making collapsible a rigid actuator. For example, a processor can cause a stimulator to reduce or terminate an electrical charge applied to an arm formed of shape-memory material, causing the arm to fall out of contact with the actuator shell. As a result, the actuator can become collapsible.

At decision diamond 802, if the operation mode is not a key press mode, then it can be determined whether the operation mode is a gesture mode at decision diamond 806. If the operation mode is a gesture mode, then depression of keys can be disallowed at block 808. The depression of a key can be disallowed either by maintaining an actuator's rigidity or by making rigid a collapsible actuator. For example, a processor can cause a stimulator to apply an electrical charge to an arm formed of shape-memory material, causing the arm to come into direct contact with the actuator shell. As a result, the actuator can become rigid.

Figure 9A:
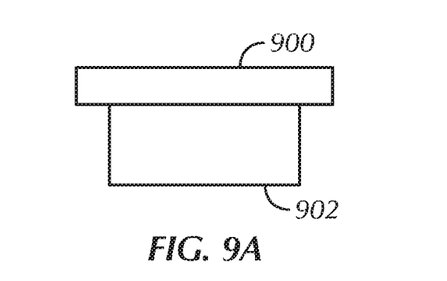
FIG. 9A illustrates an exemplary key and actuator according to embodiments of the disclosure.
Figure 9B:
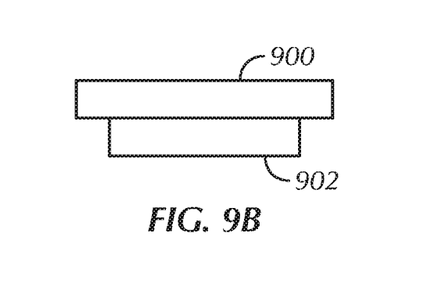
FIG. 9B illustrates an exemplary depressed key and a partially collapsed actuator according to embodiments of the disclosure.
Figure 9C:
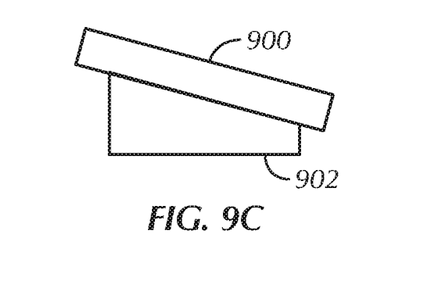
FIG. 9C illustrates an exemplary cambered key and a partially collapsed actuator according to embodiments of the disclosure.

The rigidity of an actuator can prevent a key from depressing or cambering, as illustrated in FIGS. 9A-9C. FIG. 9A illustrates an exemplary key 900 and actuator 902. FIG. 9B illustrates an exemplary depressed key 900 and a partially collapsed actuator 902. FIG. 9C illustrates an exemplary cambered key 900 and a partially collapsed actuator 902.

Figure 10A:
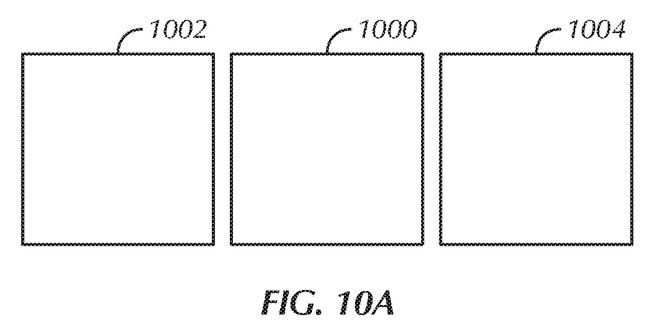
FIG. 10A illustrates an exemplary key and adjacent keys according to embodiments of the disclosure.
Figure 10B:
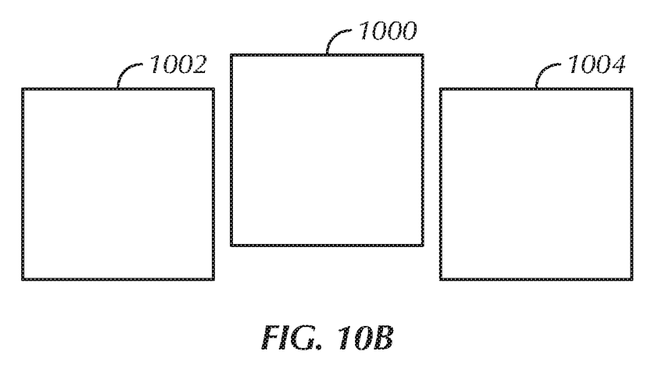
FIG. 10B illustrates an exemplary key that has slid relative to adjacent keys according to embodiments of the disclosure.
Figure 10C:
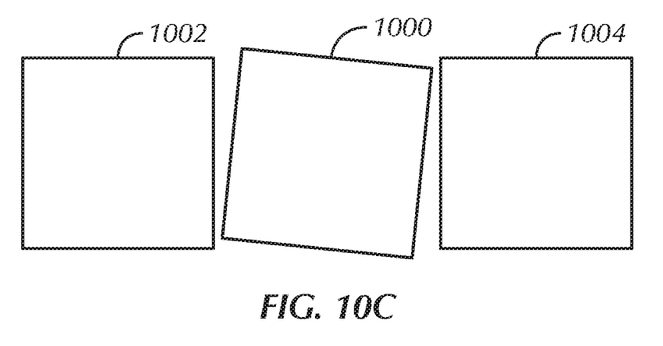
FIG. 10C illustrates an exemplary key that has rotated relative to the orientation of adjacent keys according to embodiments of the disclosure.

Additionally, the rigidity of an actuator can prevent a key from sliding or rotating, as illustrated in FIGS. 10A-10C. FIG. 10A illustrates an exemplary key 1000 and adjacent keys 1002 and 1004. FIG. 10B illustrates an exemplary key 1000 that has slid relative to adjacent keys 1002 and 1004. FIG. 10C illustrates an exemplary key 1000 that has rotated relative to the orientation of adjacent keys 1002 and 1004.

Figure 11:
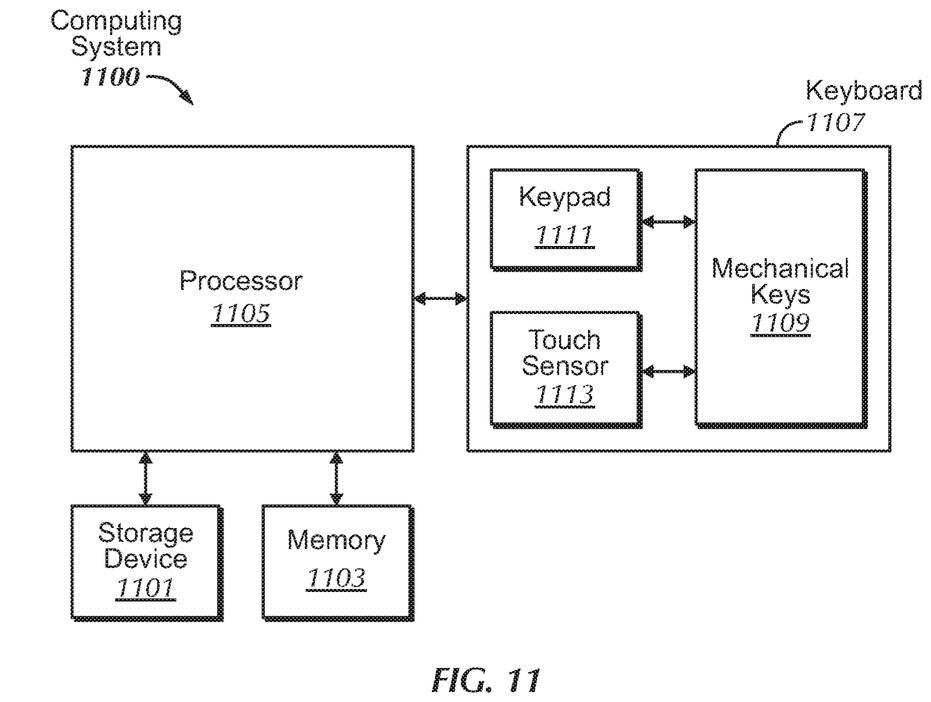
FIG. 11 illustrates an exemplary computing system that can include a keyboard according to embodiments of the disclosure.

One or more of the functions relating to configuring the depressibility of keys on a keyboard can be performed by a computing system similar or identical to computing system 1100 shown in FIG. 11. Computing system 1100 can include instructions stored in a non-transitory computer readable storage medium, such as memory 1103 or storage device 1101, and executed by processor 1105. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Computing system 1100 can further include keyboard 1107 coupled to processor 1105. Keyboard 1107 can be similar or identical to keyboard 100, 300, or 400 described above. In some embodiments, keyboard 1107 can include mechanical keys 1109, keypad 1111, and touch sensor 1113 for detecting touch events and key depressions and for providing signals indicating a detection of a touch event or key depression to processor 1105. Processor 1105 can configure the depressibility of mechanical keys 1109 on keyboard 1107 in a manner similar or identical to that described above with respect to FIG. 8.

It is to be understood that the computing system is not limited to the components and configuration of FIG. 11, but can include other or additional components in multiple configurations according to various embodiments. Additionally, the components of computing system 1100 can be included within a single device, or can be distributed between two or more devices. For example, while processor 1105 is shown separate from keyboard 1107, in some embodiments, processor 1105 can be located within keyboard 1107.

Figure 12:
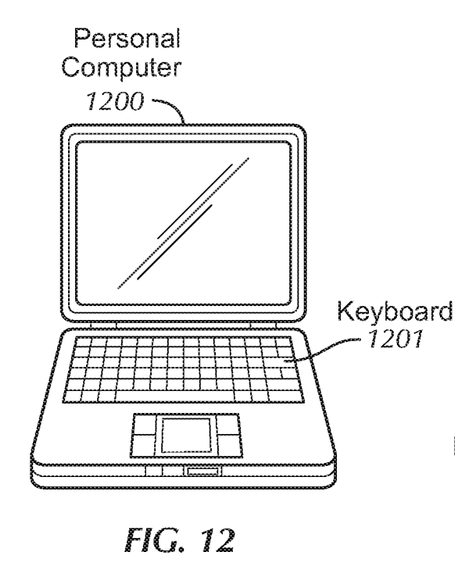
FIG. 12 illustrates an exemplary personal computer that can include a touch sensitive mechanical keyboard according to embodiments of the disclosure.

FIG. 12 illustrates an exemplary personal computer 1200 that can include a touch sensitive mechanical keyboard 1201 according to various embodiments.

Figure 13:
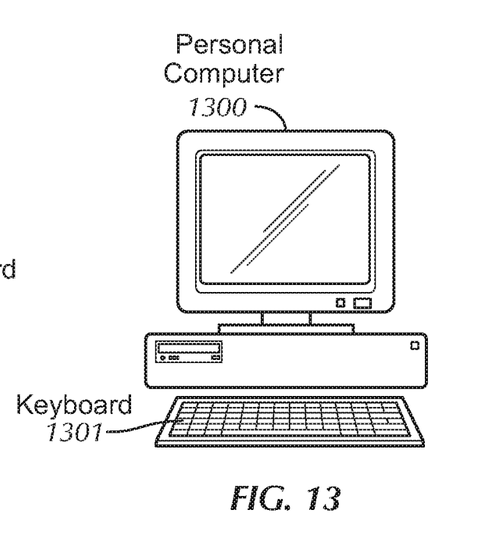
FIG. 13 illustrates another exemplary personal computer that can include a touch sensitive mechanical keyboard according to embodiments of the disclosure.

FIG. 13 illustrates another exemplary personal computer 1300 that can include a touch sensitive mechanical keyboard 1301 according to various embodiments.

The personal computers of FIGS. 12 and 13, as well as other computing devices, can receive both touch input and mechanical key input by utilizing a touch sensitive mechanical keyboard according to various embodiments.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method for configuring a keyboard having a plurality of keys with touch sensitive surfaces, comprising:
    detecting one or more objects at one or more keys in the keyboard; and
    configuring the keyboard in a first operational mode and interpreting the detected one or more objects in accordance with the first operational mode when a text input field is detected on a device communicatively coupled to the keyboard.

2. The method of claim 1, further comprising configuring the keyboard in the first operational mode when an active text input field is detected.

3. The method of claim 1, wherein the first operational mode is a keypress mode.

4. The method of claim 1, further comprising configuring the keyboard in a default operational mode until the text input field is detected.

5. The method of claim 4, further comprising selecting the default operational mode based on a state of the text input field associated with the keyboard.

6. The method of claim 4, further comprising selecting the default operational mode to be a keypress mode until a gesture or touch event is detected on the keyboard.

7. The method of claim 1, further comprising configuring the keyboard in a second operational mode and interpreting the detected one or more objects in accordance with the second operational mode when an inactive text input field or no text input field is detected.

8. The method of claim 7, wherein the second operational mode is a gesture mode.

9. The method of claim 1, further comprising detecting the one or more objects using at least one of self-capacitance sensing and mutual capacitance sensing.

10. A touch sensitive keyboard, comprising:
    a plurality of mechanical keys, each of the plurality of mechanical keys including one or more touch sensors; and a processor configured for
  detecting one or more objects at one or more of the mechanical keys in the keyboard; and
  configuring the mechanical keys in a first operational mode and interpreting the detected one or more objects in accordance with the first operational mode when a text input field is detected on a device communicatively coupled to the keyboard.

11. The touch sensitive keyboard of claim 10, further comprising configuring the keyboard in the first operational mode when an active text input field is detected.

12. The touch sensitive keyboard of claim 10, wherein the first operational mode is a keypress mode.

13. The touch sensitive keyboard of claim 10, the processor further configured for configuring the keyboard in a default operational mode until the text input field is detected.

14. The touch sensitive keyboard of claim 13, the processor further configured for selecting the default operational mode based on a state of the text input field associated with the keyboard.

15. The touch sensitive keyboard of claim 13, the processor further configured for selecting the default operational mode to be a keypress mode until a gesture or touch event is detected on the keyboard.

16. The touch sensitive keyboard of claim 10, further comprising configuring the keyboard in a second operational mode and interpreting the detected one or more objects in accordance with the second operational mode when an inactive text input field or no text input field is detected.

17. The touch sensitive keyboard of claim 16, wherein the second operational mode is a gesture mode.

18. The touch sensitive keyboard of claim 10, wherein the one or more touch sensors are at least one of self-capacitance sensors and mutual capacitance sensors.

19. A non-transitory computer readable storage medium having computer-executable instructions stored therein, which, when executed by an apparatus communicatively coupled to a keyboard having a plurality of keys with touch sensitive surfaces, performs a method of configuring the keyboard, the method comprising:
  detecting one or more objects at one or more keys in the keyboard; and
  configuring the keyboard in a first operational mode and interpreting the detected one or more objects in accordance with the first operational mode when a text input field is detected on a device communicatively coupled to the keyboard.

20. The non-transitory computer readable storage medium of claim 19, the method further comprising configuring the keyboard in a second operational mode and interpreting the detected one or more objects in accordance with the second operational mode when no text input field is detected.

* * * * *